US008801357B2

(12) United States Patent
Bonn et al.

(10) Patent No.: US 8,801,357 B2
(45) Date of Patent: Aug. 12, 2014

(54) SYSTEM FOR REMOVING A DISPLAY UNIT FROM A MULTI PANEL DISPLAY

(75) Inventors: Brian Bonn, Scotts Valley, CA (US); David Inori, Santa Rosa, CA (US); Nigel F. Misso, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 611 days.

(21) Appl. No.: 13/016,851

(22) Filed: Jan. 28, 2011

(65) Prior Publication Data

US 2011/0188981 A1  Aug. 4, 2011

Related U.S. Application Data

(60) Provisional application No. 61/299,914, filed on Jan. 29, 2010.

(51) Int. Cl.
*B66C 3/00* (2006.01)

(52) U.S. Cl.
USPC ........................................................ 414/785

(58) Field of Classification Search
USPC .......... 414/592, 560, 331.05, 331.04, 331.14, 414/266, 268, 269, 632, 637, 665, 669, 414/744.2, 744.3, 744.7, 785; 254/133 R, 254/100, 7 R, 7 C
See application file for complete search history.

(56) References Cited

U.S. PATENT DOCUMENTS

| 3,042,372 | A | * | 7/1962 | Zeigler ........................ 254/7 C |
| 4,546,891 | A | | 10/1985 | Langigan, Sr. et al. |
| 5,570,990 | A | * | 11/1996 | Bonora et al. ................ 414/543 |
| 6,099,234 | A | * | 8/2000 | Mason .......................... 414/607 |
| 6,357,984 | B1 | * | 3/2002 | Zinger et al. ............. 414/331.05 |
| 6,704,989 | B1 | | 3/2004 | Lutz et al. |
| 2008/0263924 | A1 | | 10/2008 | Nearman et al. |

OTHER PUBLICATIONS

EP Search Report for Application No. 11152749.5-1231 / 2355075 dated Mar. 22, 2012.
Anonymous: 9X Media PMC Portable Media Center, 9X Media, Jan. 26, 2010, XP002670539, 4 Pages.
EPO Office Communication for Application No. 11152749.5-1231 / 2355075; Dated May 2, 2012.

* cited by examiner

*Primary Examiner* — Saul Rodriguez
*Assistant Examiner* — Glenn Myers
(74) *Attorney, Agent, or Firm* — Patterson & Sheridan, LLP

(57) ABSTRACT

A lift system removes a display unit or components thereof from a tiled display wall in a way that minimizes the risk of damaging the removed display unit and other display units in the tiled display wall. A lifting structure is configured to selectively lift one or more display units away from the desired display unit when the lifting structure is raised by a vertical motion actuator. The lifting structure is further configured to be free to rotate slightly about a vertical axis when lifting the display units, so that the lifted display units are not constrained to purely vertical translation when lifted away from the desired display unit.

20 Claims, 11 Drawing Sheets

US 8,801,357 B2

SYSTEM FOR REMOVING A DISPLAY UNIT FROM A MULTI PANEL DISPLAY

CROSS-REFERENCE TO RELATED APPLICATIONS

This application claims the priority benefit of the U.S. Provisional Patent Application filed on Jan. 29, 2010 and having Ser. No. 61/299,914. The subject matter of this related application is hereby incorporated herein by reference.

BACKGROUND OF THE INVENTION

1. Field of the Invention

Embodiments of the present invention relate generally to multi-panel display systems and, more specifically, to apparatus for removing a display unit from such systems.

2. Description of the Related Art

Electronic display systems are commonly used to display information from computers and other sources. Typical display systems range in size from small displays used in mobile devices to very large displays that are used to display images to thousands of viewers at one time. Tiled display walls provide a large-format environment for presenting large high-resolution images by synchronizing and coupling the output from multiple distinct imaging systems. Such large displays may be created by tiling a plurality of smaller display units together. For example, video walls frequently seen in the electronic media typically use multiple display units, such as flat-panel displays, which are tiled to create such large displays. An issue with tiled displays is that the gap present between the constituent display units can produce a grid pattern visible to the viewer.

FIG. 1A is a schematic perspective view of a typical tiled display device 100 having an array of display units 102 that are each used to display portions of an image to a viewer 108. The array of display units 102 forms a grid pattern 101 found within a displayed image 107, which is shown in FIG. 1B. Grid pattern 101 may be formed by a frame, bezel, or unilluminated peripheral region circumscribing each of the display units 102, and/or by the gap 103 present between adjacent display units 102. FIG. 1B is a schematic view of tiled display device 100 in FIG. 1 from the perspective of viewer 108 that further illustrates the grid pattern 101 that may be visible to the viewer within displayed image 107. The presence of a noticeable grid pattern in display device 100, such as grid pattern 101, can be distracting for viewer 108. In order for tiled display device 100 to produce a uniform display, free of visible grid pattern 101, it is important to reduce the width and variation of gap 103 between adjacent display units 102. For example, in many applications, it may be desirable for gap 103 may be on the order of 1 mm or less.

Display units 102 for a typical tiled display can be relatively bulky, heavy, and include delicate external components, such as the precisely shaped glass panels often used as an image forming surface. As noted above, in a tiled display device the edges of these glass panels may be placed less than a millimeter apart to avoid producing grid pattern 101. Consequently, removal and replacement of a display unit 102 that is damaged or needs service is problematic due to the risk of damaging additional display units 102 while removing the damaged unit.

As the foregoing illustrates, there is a need in the art for a system for removing a display unit from a tiled wall display in an improved fashion relative to prior art devices.

SUMMARY OF THE INVENTION

One embodiment of the present invention sets forth a system for removing a display unit or components thereof from a tiled display wall in a way that minimizes the risk of damaging the removed display unit and other display units in the tiled display wall. To remove a desired display unit, a lifting structure is configured to selectively engage and lift one or more display units away from the desired display unit when the lifting structure is raised by a vertical motion actuator. The lifting structure is further configured to be free to rotate slightly about a vertical axis when lifting the one or more display units, so that the lifted display units are not constrained to purely vertical translation when lifted away from the desired display unit. Instead, the lifted display units are each free to move slightly to either side so that small conflicts or mismatches with adjacent display units do not interfere with the vertical movement of the lifted display units, thereby avoiding damage during the lifting process.

One advantage of the present invention is that a display unit can be removed from a tiled display wall with minimal risk of damaging delicate external components of the display unit. Another advantage of the present invention is that display units that have been moved to create adequate clearance for access to another display unit can be quickly and repeatably returned to their original locations without the need for additional position adjustment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1A:
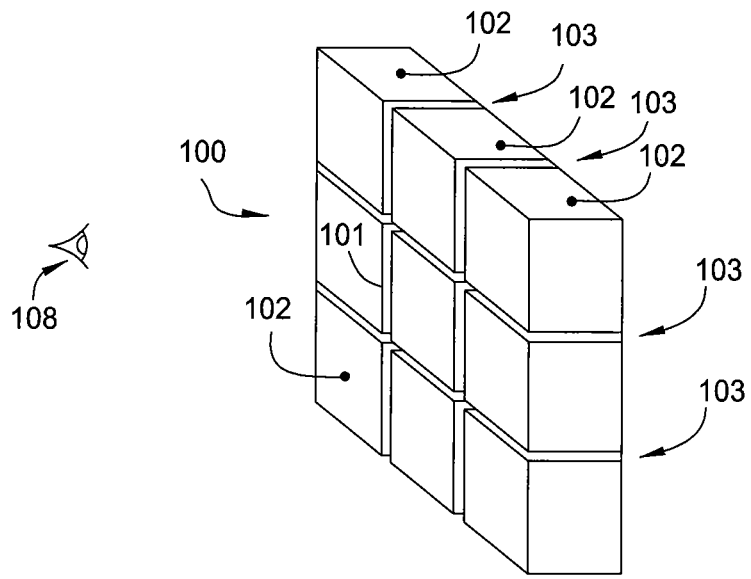
FIG. 1A is a schematic perspective view of a typical tiled display device having an array of display units that are each used to display portions of an image to a viewer.
Figure 1B:
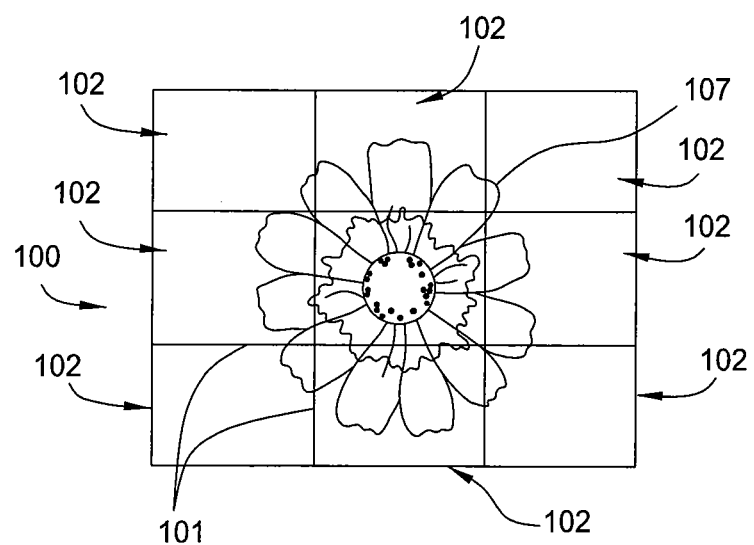
FIG. 1B is a schematic view of the tiled display device in FIG. 1A from the perspective of a viewer that further illustrates the grid pattern that may be visible to the viewer within a displayed image.
Figure 2:
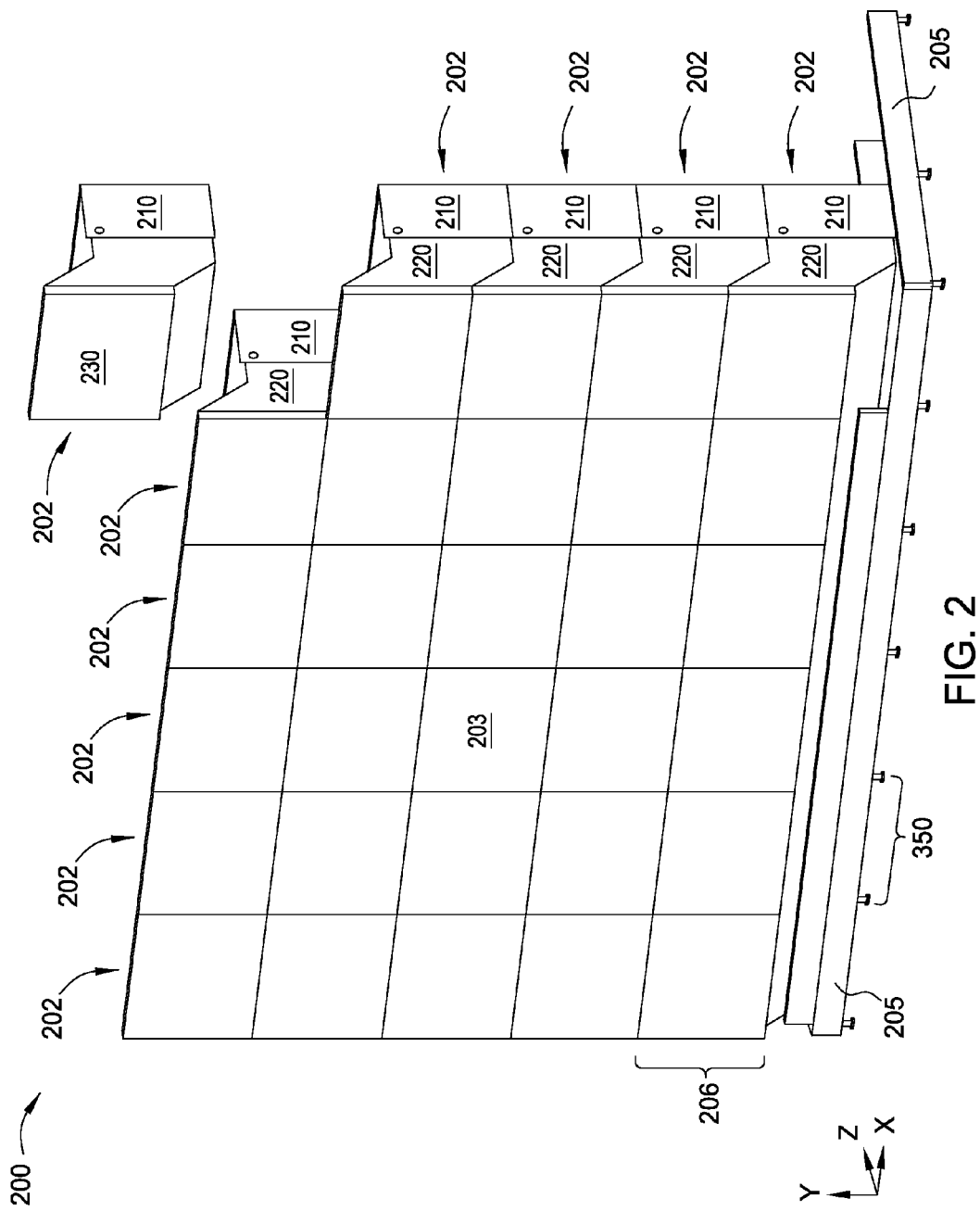
FIG. 2 illustrates a multi-panel display 200 according to various embodiments of the invention.

FIG. 2 illustrates a multi-panel display 200 according to various embodiments of the invention. Multi-panel display 200 includes a plurality of display units 202 assembled to form a display surface 203. In some embodiments, display surface 203 is a planar viewing surface, while in other embodiments, display surface 203 may be curved. For purposes of description, one of display units 202 in FIG. 2 is shown positioned above multi-panel display 200 prior to installation. Multi-panel display 200 is depicted as a six-tile by five-tile array, i.e., six columns of five display units, but any multi-tile display falls within the scope of the invention. In some embodiments, multi-panel display 200 includes a base structure 205 configured to provide stability against tipping and a means for seismic restraint. In such embodiments, base structure 205 is precisely leveled and a first row 206 of display units 202 are mechanically coupled thereto base structure 205 so that first row 206 forms a level datum for the remaining display units 202 of multi-panel display 200.

Each display unit 202 is a light-based electronic display device, such as a laser-phosphor display (LPD), a light-emitting diode (LED) digital light processing (DLP), or an LED-liquid crystal display (LCD) device, and is configured to operate in conjunction with the other display units 202 to produce a single coherent image for a viewer. Each display unit 202 includes a precision frame 210, a projection assembly 220, and a display panel 230. Projection assembly 220 is mounted on a precision frame 210, and display panel 230 is mounted on projection assembly 220.

Precision frame 210 is a structural assembly configured to be mechanically coupled to precision frames 210 of adjacent precision display units 202 to form a rigid structural truss for multi-panel display 200, according to embodiments of the invention. A precision frame, as defined herein, is a structure having precisely located datum surfaces, projections, and/or other features configured to define the position of the structure when mechanically coupled to another such structure. In some embodiments, each precision frame 210 includes two precision pins located on a top surface and mating sockets on a bottom surface to accurately set the vertical pitch between each display unit 202 and to laterally and rotationally constrain each display unit when positioned on top of another display unit to prevent tilting (rotation about the z-axis), rocking (rotation about the x-axis), and rotation about the y-axis. Examples of such precision pins are described below in conjunction with FIG. 7. In some embodiments, each precision frame 210 further includes datum surfaces on each side to further define the lateral position of each display unit 202, i.e., horizontal pitch. In some embodiments, horizontal latching devices may be employed to further stiffen the structural truss of multi-panel display 200 formed by precision frames 210. Suitable horizontal latching devices that may be used are described in co-pending U.S. patent application Ser. No. 13/013,759, "Latch System for Coupling Precision Frames," filed Jan. 25, 2011.

It is noted that in addition to precision frames 210, no other structure is needed for positioning the plurality of display panels 230 to produce planar display surface 203 of multi-panel display 200. This lack of additional support structure is evident in FIG. 2, where one display unit 202 is shown positioned above multi-panel display 200 prior to installation. It is further noted that while precision frame 210 is described herein as a separate component of each display unit 202, in some embodiments of the invention, precision frame 210 may be integral to each display unit 202.

Projection assembly 220 includes light sources, optics, and control systems for forming a desired portion of an image on display panel 230, and display panel 230 is the image-forming surface seen by a viewer. For example, when display unit 202 is a laser-phosphor display (LPD), projection assembly 220 includes multiple lasers and associated optics to "paint" different regions of phosphor-containing strips disposed on display panel 230 to produce an image for a viewer, where the optical output energy of each laser paints a different phosphor-containing region of the display. In order to permit a more contiguous image across the assembly, adjacent tiles are positioned as close as practicable to each other. Consequently, display panel 230 is a fragile and precisely shaped glass sheet that will be positioned as closely as practicable to and aligned with adjacent display panels to minimize a grid pattern on planar display surface 203 visible to a viewer.

Figure 3:
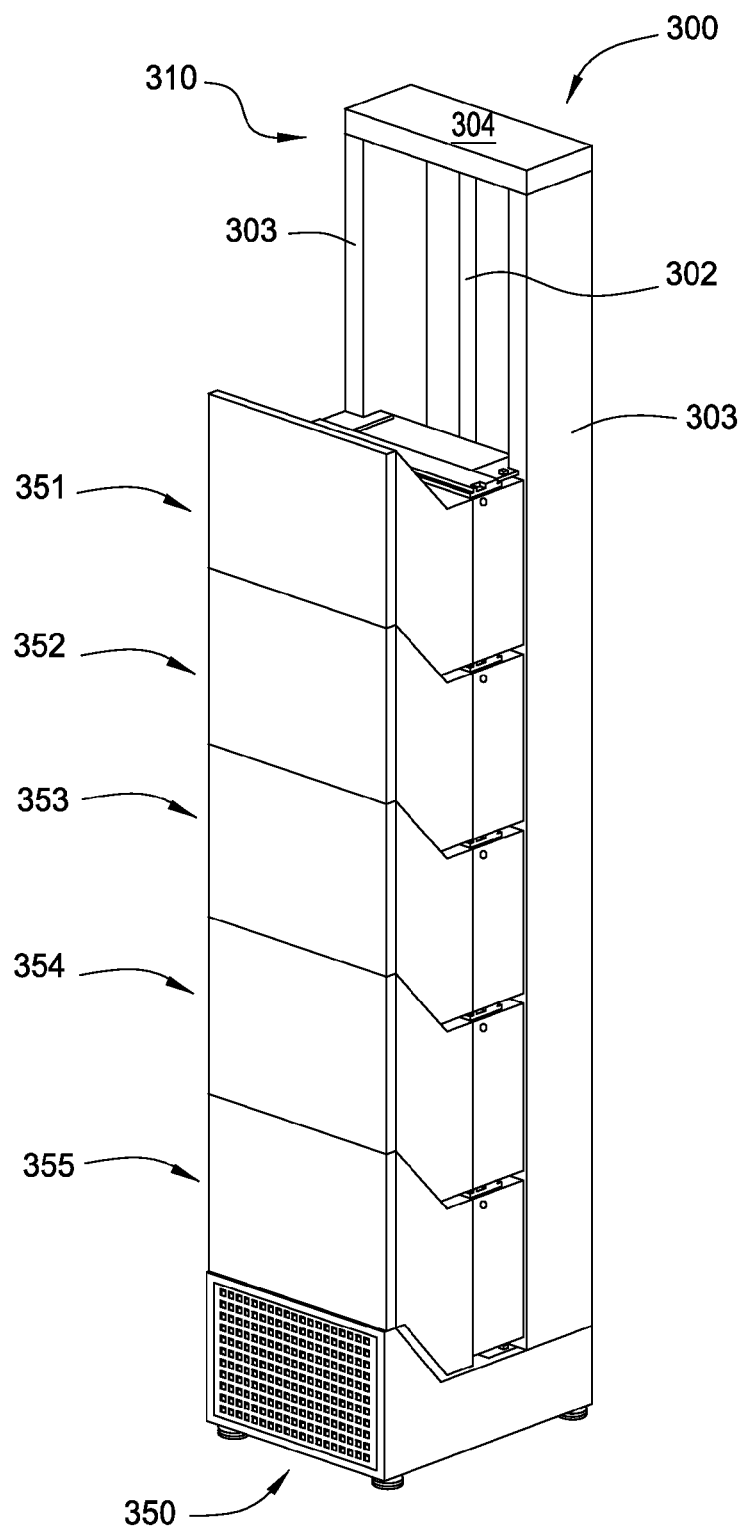
FIG. 3 illustrates a lift system for accessing a display unit in a multi-panel display and a plurality of display units that form a column of the multi-panel display in FIG. 2, according to one embodiment of the invention.

FIG. 3 illustrates a lift system 300 for accessing a display unit in multi-panel display 200 and a plurality of display units 351-355 that form a column 350 of multi-panel display 200 in FIG. 2, according to one embodiment of the invention. Lift system 300 includes a lift structure 301, a support column 302 disposed inside lift structure 301, a lift system support frame 310, and a vertical motion actuator 500 (shown in FIG. 5). Alternatively, support column 302 may be a rail situated adjacent to lift structure 301. Column 350 can be any column of display units 202 contained in multi-panel display 200 and includes display units 351-355. Structural details and alignment features of display units 351-355 are described below in conjunction with FIG. 7.

Lift system support frame 310 includes support columns 303 and a top piece 304. Lift system support frame 310 serves as an independent structural support system for lift system 300 and is coupled to support column 302 via top piece 304. In addition, support frame 303 and/or structures mounted thereon can be configured as a vertical rail system that keeps display units 202 aligned as desired during the lifting process. Because lift system support frame 310 is structurally independent from column 350, lift system 300 can be repositioned adjacent to any column 350 in multi-panel display 200 that has a display unit 202 in need of removal or service. Alternatively, one lift system 300 may be installed behind each column 350 making up multi-panel display 200.

Lift structure 301 is used to lift one or more of the display units of column 350 and thereby facilitate access to one of display units 351-355 for removal or repair. Lift structure 301 is a lifting mechanism configured to selectively engage and lift one or more of display units 351-354 when the lifting structure is raised by vertical motion actuator 500. Lift structure 301 is further configured to be free to rotate slightly about a vertical axis when lifting the one or more display units so that the lifted display units are not constrained to purely vertical translation when being lifted. For example, lifted display units may be free to rotate approximately ±10 degrees about a vertical axis during the lifting process before being constrained rotationally by support frame 303 and/or structures mounted thereon. In some embodiments, lift structure 301 rotates about support column 302, which may be disposed coaxially inside lift structure 301. In addition, during the lifting process, display units 351-354 are each engaged and lifted by a single lifting member and therefore are relatively unconstrained, i.e., are not rigidly held, while translating vertically. Thus, display units 351-355 that are being lifted by lift structure 301 can move slightly to either side so that small conflicts or mismatches with adjacent tiles do not interfere with the upward or downward movement of the lifted display units, thereby avoiding damage to display panels 230 of display units 202 during the lifting process.

Figure 4:
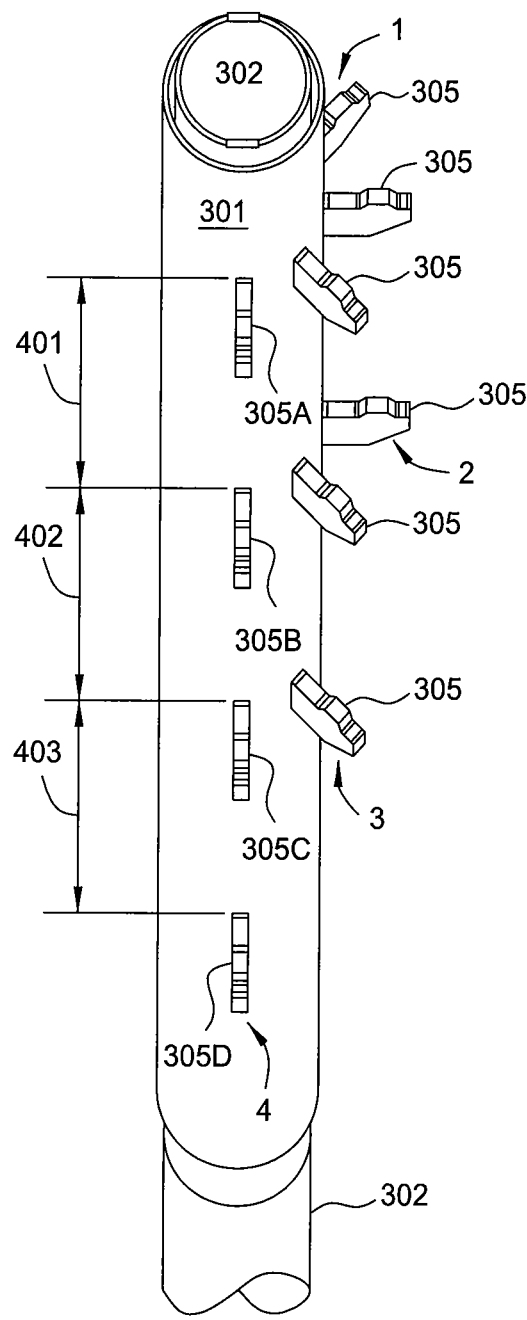
FIG. 4 illustrates a perspective view of a lift structure and a support column, according to an embodiment of the invention.

FIG. 4 illustrates a perspective view of lift structure 301 and support column 302, according to an embodiment of the invention. As shown, lift structure 301 includes a plurality of lifting members 305 arranged in multiple lift position groups 1-4, where each of these lift position groups: 1) corresponds to a particular lift position of lift structured 301; 2) is made up of vertically aligned lifting members 305; and 3) is radially offset on lifting structure 301 from the other lift positions. In addition, each of lift position groups 1-4 includes a unique combination of lifting members 305 configured to engage and lift a unique combination of display units 202. Thus, when lift structure 301 is rotated to a lift position 1, lift position group 1 is positioned to engage and lift display unit 351 with a single lifting member 305 when lift structure 301 is raised by vertical motion actuator 500. Similarly, when lift structure 301 is rotated to a lift position 2, the two lifting members 305 of lift position group 2 are positioned to engage and lift display units 351 and 352; when lift structure 301 is rotated to a lift position 3, lift position group 3 is positioned to engage and lift display units 351-353; and when lift structure 301 is rotated to a lift position four, lift position group 4 is positioned to engage and lift display units 351-354. The relative radial positions of lift positions 1-4 are illustrated more clearly in FIG. 5.

Figure 5:
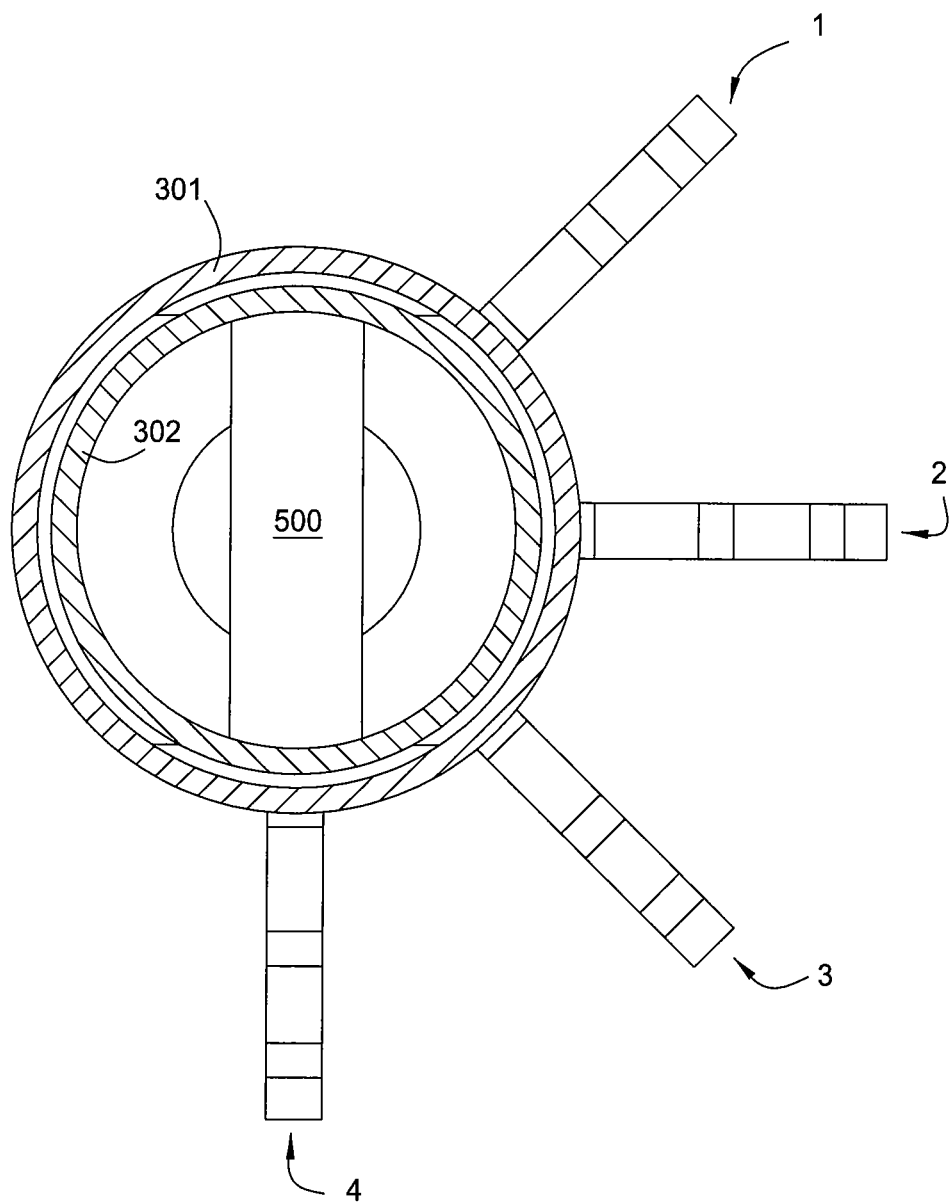
FIG. 5 illustrates a plan view of the lift structure of FIG. 4 with lifting elements arranged in four lifting positions, according to one embodiment of the invention.

FIG. 5 illustrates a plan view of lift structure 301 with lifting elements 305 arranged in four lifting positions, according to one embodiment of the invention. As shown, lifting positions groups 1-4 are each positioned at a different radial location on lifting structure 301. Support column 302 is disposed in lift structure 301 to serve as a support structure for lift structure 301 and to provide a vertical track along which lift structure 301 translates when lifted and lowered by vertical motion actuator 500. Vertical motion actuator 500 raises and lowers lift structure 301 and may be any linear actuator known in the art, such as a pneumatic actuator or a lead-screw-based actuator. In FIG. 5, vertical motion actuator 500 is depicted inside support column 302. In other embodiments, vertical motion actuator 500 may be located adjacent to lift structure 301 and outside support column 302. When selecting a particular lift position, lift structure 301 may be rotated manually or by means of a motorized or otherwise powered actuator.

When installed in multi-panel display 200, display panels 230 of display units 202 are closely positioned, i.e., they have a separation on the order of about 1 mm or less. Because lift structure 301 is configured to allow slight movement of display units 351-355 such a small gap is likely to result in damage to display panels 230 during the lifting process. In some embodiments, lifting elements 305 of lift structure 301 are configured to minimize contact between vertically adjacent display units 351-355 during the lifting and lowering process to prevent such damage. In such embodiments, lifting elements 305 in one lift position group are configured to sequentially engage and lift the desired display units in column 350 starting with the topmost display unit, i.e., display unit 351, and lifting and engaging progressively lower display units once a desired gap has formed between the lifted display unit and the next display unit to be lifted. Specifically, the separation between lifting elements 305 in a particular lift position group is non-uniform and increases between lower lifting elements 305 in the lift position group. The non-uniform and increasing separation between lifting elements 305 in one lift position group is illustrated in FIG. 4.

Referring to lift position group 4 in FIG. 4, lifting element 305A is positioned to engage and lift the top display unit in column 350 during the lifting process, i.e., display unit 351. Similarly, lifting element 305B is positioned to engage and lift display unit 352, lifting element 305C is positioned to engage and lift display unit 353, and lifting element 305D is positioned to engage and lift display unit 354. Accordingly, separation 401 between lifting element 305A and lifting element 305B is equal to the height of display unit 351 plus the height of the gap desired between display unit 351 and display unit 352 during the lifting process. Thus, display unit 352 is not engaged and lifted until a desired gap between display units 351 and 352 has formed. Separation 402 between lifting element 305B and lifting element 305C is equal to the height of display unit 352 plus the height of the gap desired between display unit 351 and display unit 352 during the lifting process and the height of the gap desired between display unit 352 and 353 during the lifting process. Thus, assuming each of display units 351-354 are of uniform height, configuring separation 402 to be greater than separation 401 by the gap desired between display units 352 and 353 ensures that display unit 353 is not engaged and lifted until the desired gap between display units 352 and 353 has formed. In a similar vein, separation 403 is configured to be greater than separation 402 by the gap desired between display units 353 and 354 during the lifting process.

Figure 6:
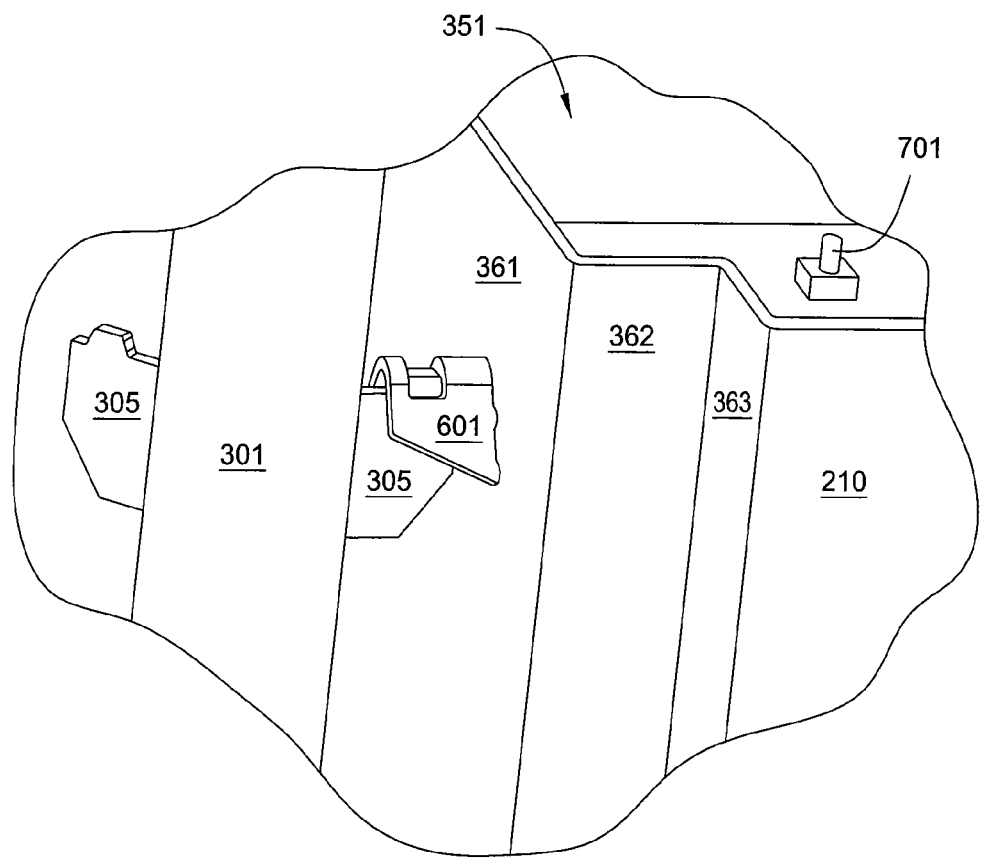
FIG. 6 illustrates a perspective view of the lifting structure of FIG. 3 engaged with and lifting a display unit, according to one embodiment of the invention.

In operation, lift system 300 lifts one or more of display units 351-354 via lift structure 301 to facilitate access to one of display units 351-355 for removal or repair. For example, in order to access and/or remove display unit 355, all of display units 351-355, must be raised. Thus, lift structure 301 is rotated to lift position 4 so that lifting elements 305A-305D are positioned to engage and lift display units 351-354. FIG. 6 illustrates a perspective view of lifting structure 301 engaged with and lifting a display unit, according to one embodiment of the invention. As lift structure 301 is raised, lifting element 305 engages a mating hook 601 disposed on a rear surface 361 of precision frame 210 of display unit 351, thereby lifting display unit 351 off of display unit 352. For clarity, support column 303 has been omitted from FIG. 6. In practice, support column 303 and/or structures mounted thereon can be configured as a vertical rail system that keeps display unit 351 aligned as desired during the lifting process by contacting one or more rear surfaces 361-363 of display unit 351.

Figure 7:
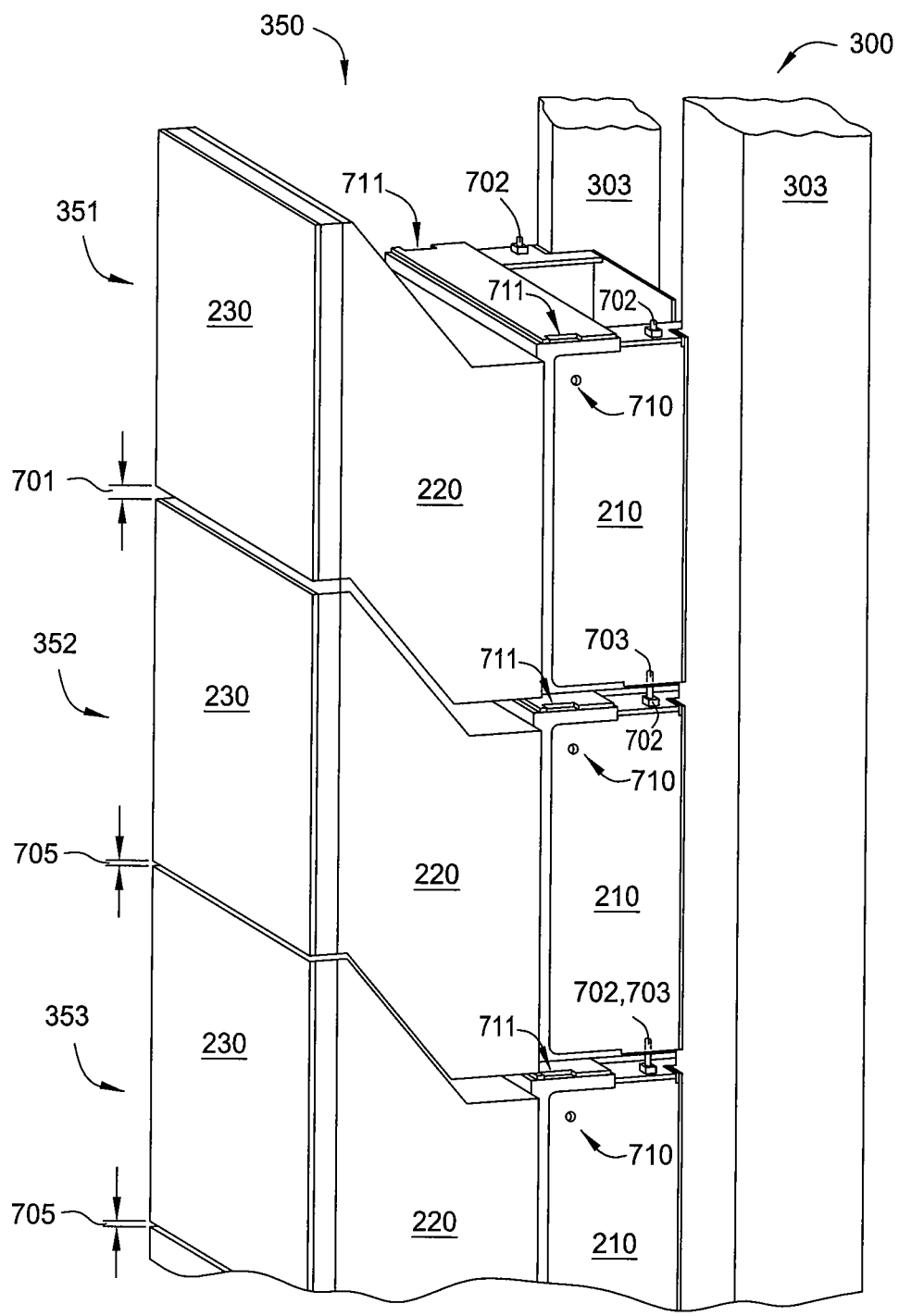
FIG. 7 illustrates a partial perspective view of the column of display units and the lift system in FIG. 3 as a display unit is lifted to allow access to a lower display unit, according to one embodiment of the invention.

FIG. 7 illustrates a partial perspective view of column 350 and lift system 300 in FIG. 3 as display unit 351 is lifted to allow access to a lower display unit, according to one embodiment of the invention. In FIG. 7, lift structure 301 (not shown for clarity) is engaged with and has lifted display unit 351 to form a lifting gap 701 between display unit 351 and display unit 352. In so doing, lift structure 301 has lifted display unit 351 off of two precisely placed pins 702 disposed on a top surface of the precision frame 210 of display unit 352. Prior to lifting, pins 702 are seated in mating sockets 703 disposed on the underside of the precision frame 210 of display unit 351. Pins 702 and mating sockets 703 are also disposed on the remaining display units of column 350 to accurately set the vertical pitch between each of display units 351-355 and to laterally and rotationally constrain the display units of column 350 when installed in multi-panel display 200.

It is noted that in FIG. 7, installation gap 705, which is minimized to reduce a visible grid pattern, is still present between display units 352 and 353, since these display units have not been lifted by lift structure 301 and are still resting on the display unit of concern, i.e., the display unit to be accessed and/or removed. The position of each display panel 230 can be fine-tuned with respect to adjacent display panels 230 in multi-panel display 200 so that installation gap 705 is uniform around display panel 230 and display panel 230 is planar and square with adjacent display panels 230. In some embodiments, projection assembly 220 of each display panel is hung onto a precision fixed pin 710 disposed on two or more interior surfaces of precision frame 210. In such embodiments, projection assembly 220 includes an adjustable hanger 720 (shown in FIG. 10) that can be adjusted vertically (along the y-axis) and horizontally (along the z-axis) using adjustment screws 711. Because the fine-tuned position of display units 351-355 in multi-panel display 200 relies on adjustable hangers and precision pins, these display units retain the original relative position with respect to adjacent display units when lowered back into place, and no addition position adjustment is required after being raised and lowered by lift system 300.

Figure 8:
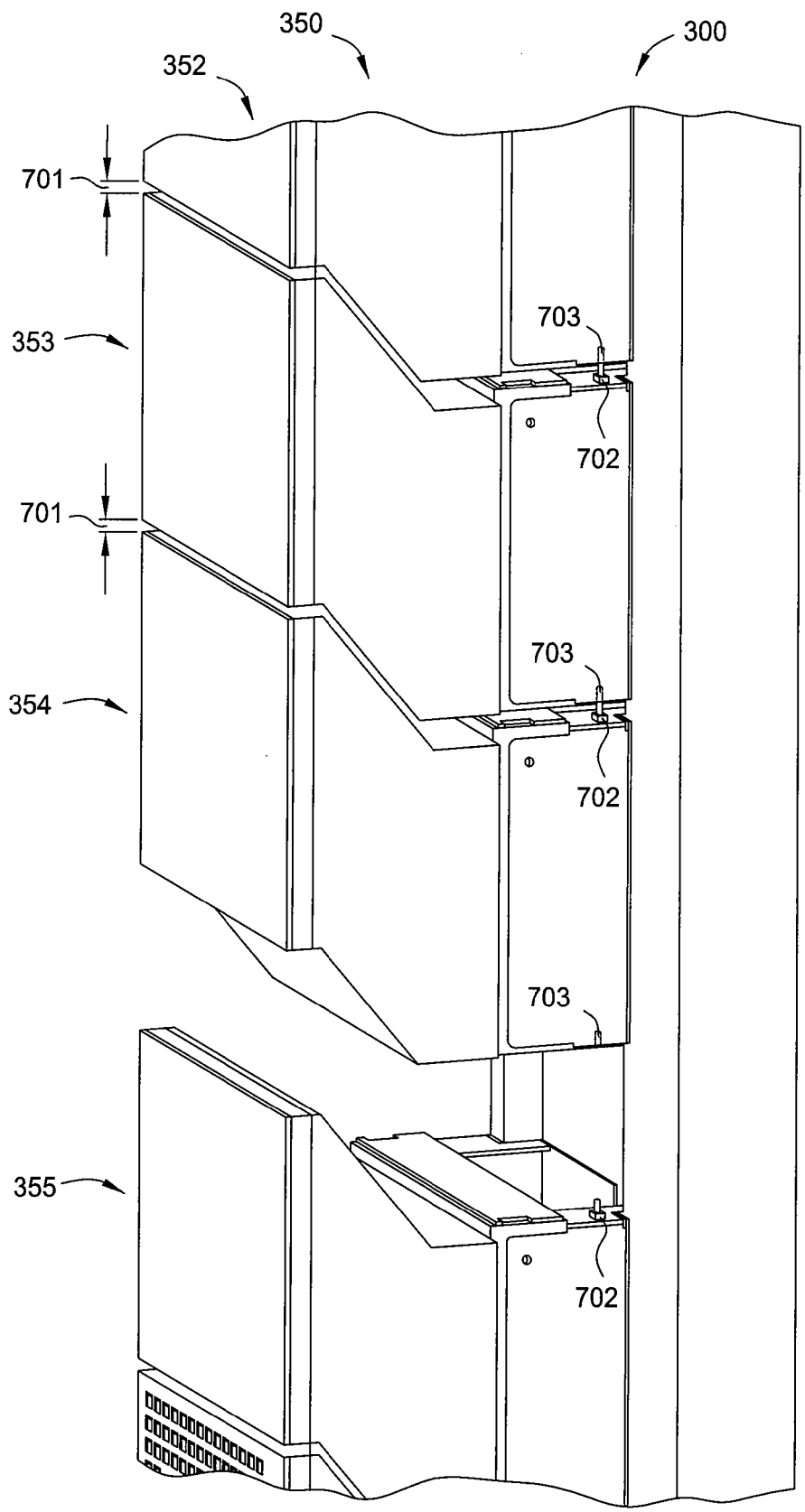
FIG. 8 illustrates a partial perspective view of the column of display units and the lift system in FIG. 3 as multiple display units are lifted to allow access to a lower display unit, according to one embodiment of the invention.

FIG. 8 illustrates a partial perspective view of column 350 and lift system 300 as display units 351-354 are lifted to allow access to a lower display unit, according to one embodiment of the invention. As shown, lift structure 301 has lifted display units 351-354 away from display unit 355 so that display unit 355 may be accessed and/or removed for service, replacement, etc. Display units 352 and 353 are separated by lifting gap 701 and display units 353 and 354 are also separated by lifting gap 701. Consequently, pins 702 are not mated with mating sockets 703 and display units 351-354 are free to move independently of each other during the lifting process.

Figure 9:
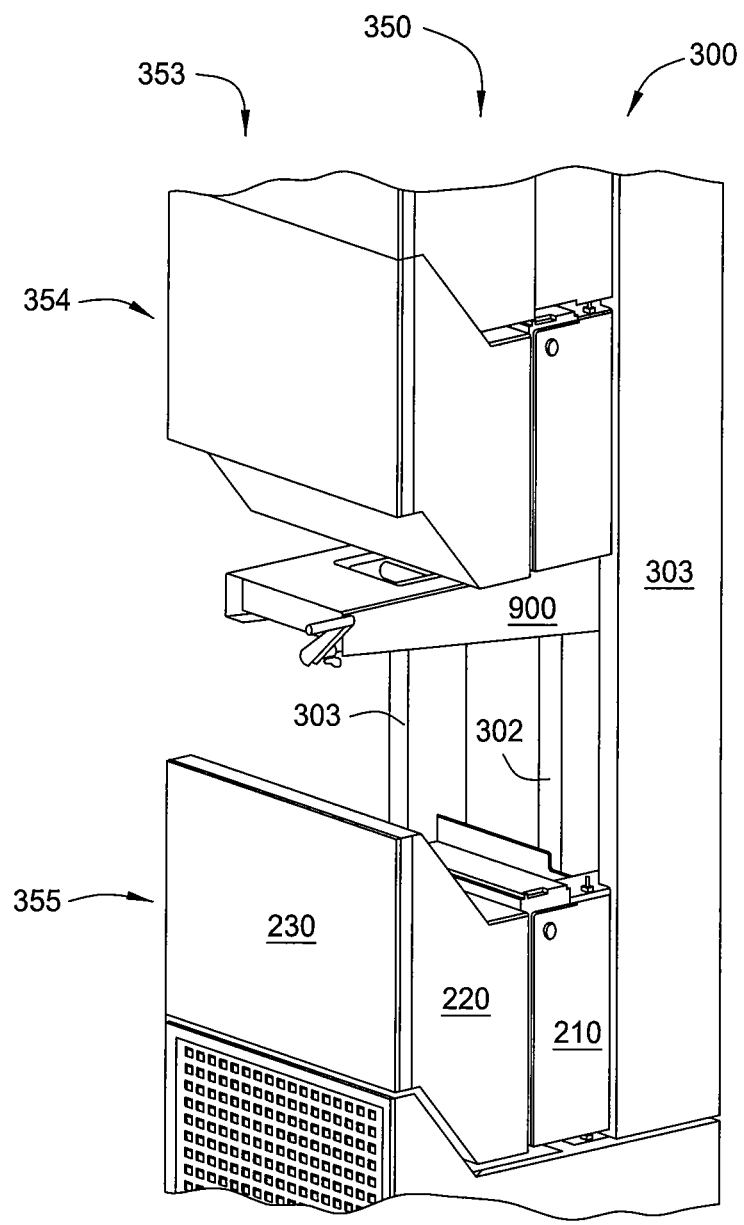
FIG. 9 illustrates a partial perspective view of the column of display units and the lift system in FIG. 3 after the installation of a removable lifting mechanism 900, according to a different embodiment of the invention.

FIG. 9 illustrates a partial perspective view of column 350 and removal system 300 after the installation of a removable lifting mechanism 900, according to a different embodiment of the invention. Once sufficient clearance has been attained above the display unit of concern, which in FIG. 9 is display unit 355, removable lifting mechanism 900 is mechanically coupled to support columns 303 so that projection assembly 220 of display unit 355 can be removed from multi-panel display 200. In some embodiments, removable lifting mechanism 900 is bolted or clamped on to support columns 303. In other embodiments, a latch mechanism or shelf is disposed on support columns 303 and/or support column 302 to facilitate attachment of removable lifting mechanism 900. In yet other embodiments, removable lifting mechanism 900 is temporarily attached to support column 302.

Figure 10:
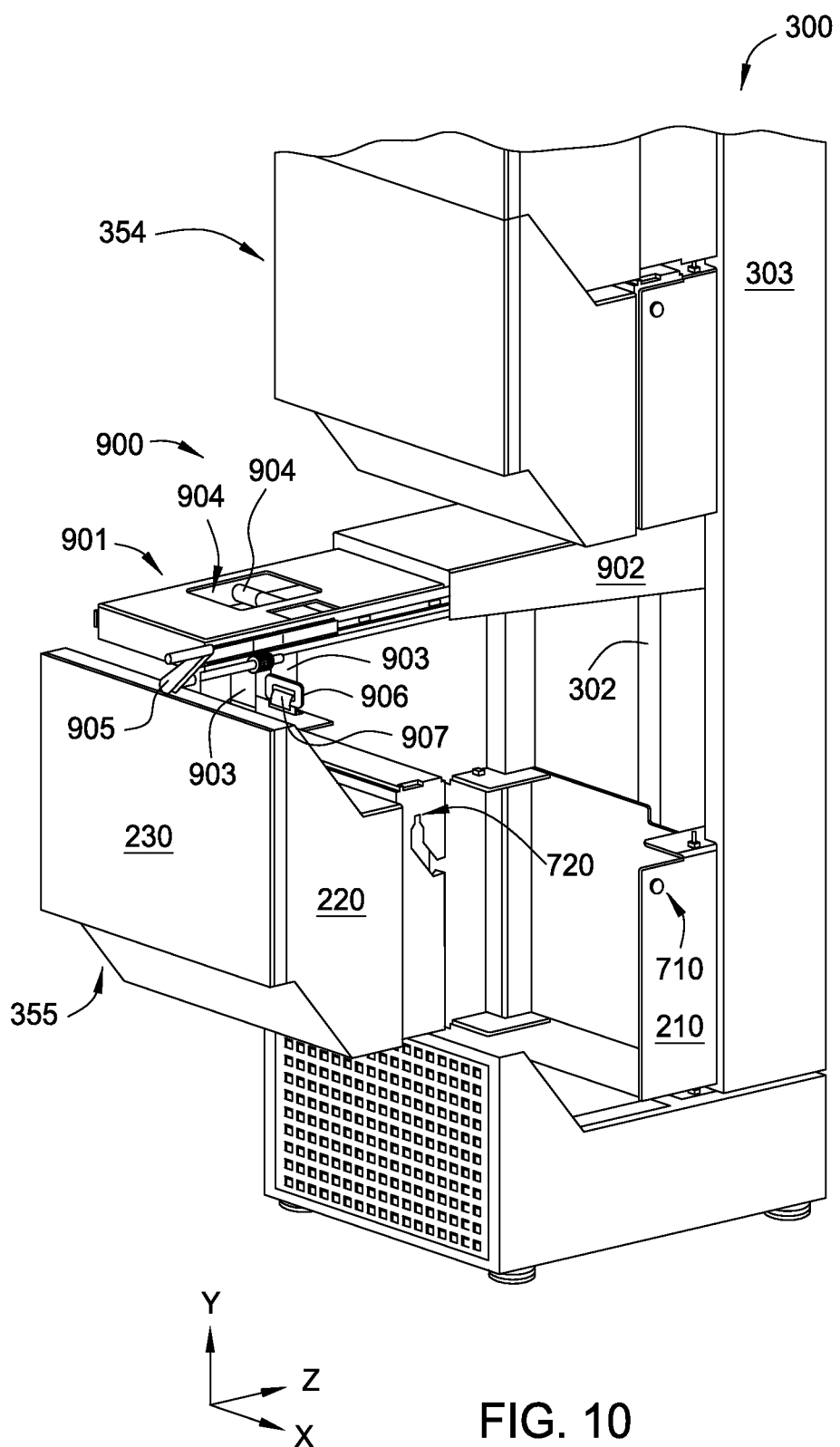
FIG. 10 illustrates a partial perspective view of the column of display units and the lift system in FIG. 3 after a projection assembly of a display unit has been lifted up and extended out by a removable lifting mechanism, according to the different embodiment of the invention.

FIG. 10 illustrates a partial perspective view of column 350 and lift system 300 after projection assembly 220 of display unit 355 has been lifted up and extended out by removable lifting mechanism 900, according to the different embodiment of the invention. Removable lifting mechanism 900 includes an extension assembly 901, a base assembly 902, lifting straps 903, winder drums 904 and a cranking device 905. In some embodiments, removable lifting mechanism 900 includes two winder drums 904 that each have two lifting straps attached. In such an embodiment, the four points of attachment provided constrain the rotation of the display unit being lifted, thereby facilitating the safe removal of projection assembly 220 from the display unit of interest. Specifically, having at least two points of connection that are aligned along the z-axis prevent rotation of projection assembly 220 about the x-axis when lifted by removable lifting mechanism 900. Similarly, having at least two points of connection that are aligned along the x-axis prevent rotation of projection assembly 220 about the z-axis when lifted by removable lifting mechanism 900, and the attachment of multiple attachment points in the x-z plane minimizes rotation of projection assembly 220 about the y-axis.

Figure 11:
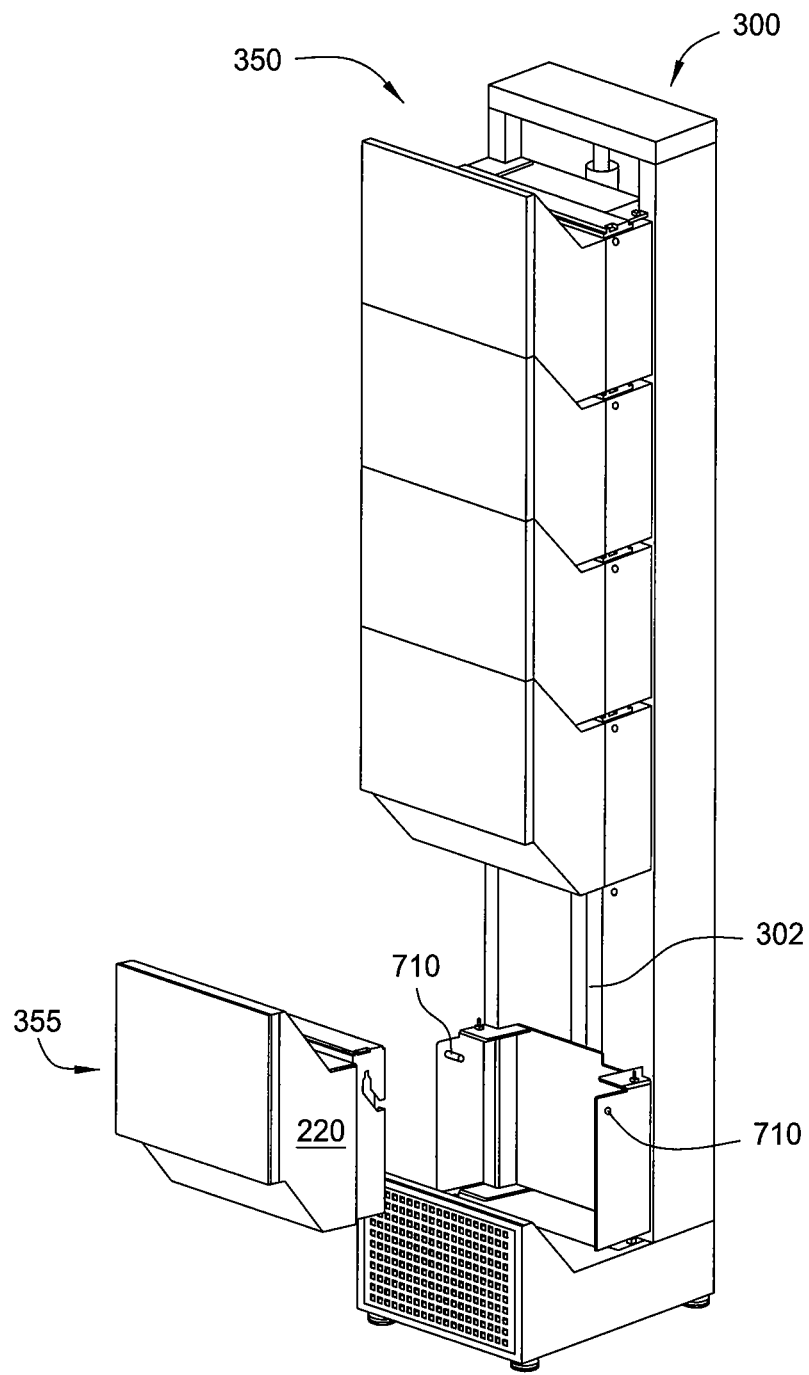
FIG. 11 illustrates a perspective view of the column of display units and the lift system in FIG. 3 after a projection assembly of a display unit has been lifted up and extended out by a removable lifting mechanism, according to the different embodiment of the invention.

In operation, removable lifting mechanism 900 conveniently removes a projection assembly 220 from a precision frame 210 with little risk of damaging delicate external components of projection assembly 220, such as display panel 230. Cranking device 905 is rotated manually or with a motorized actuator to lower lifting straps 903, each of which includes an attachment ring 906. Attachment rings 906 are then coupled to corresponding hooks 907 mounted on projection assembly 220. Hooks 907 may be permanent external features of projection assembly 220 or may be installed temporarily in preparation for the removal of projection assembly 220. Cranking device 905 is rotated to raise lifting straps 903 and projection assembly 220, thereby lifting projection assembly 220 and adjustable hanger 720 off of precision fixed pins 710. Once cranking device 905 has raised projection assembly 220 to a level with suitable clearance, extension assembly 901 can be extended from base assembly 902 to complete removal of projection assembly 220 from multi-panel display 200. FIG. 11 illustrates a perspective view of column 350 and lift system 300 after projection assembly 220 of display unit 355 has been lifted up and extended out by removable lifting mechanism 900, according to the different embodiment of the invention.

Installation of a projection assembly 220 into precision frame 210 of display unit 355 follows the reverse procedure as outlined above and display units 351-354 are lowered back in place. Because the lifted display units, i.e., display units 351-354, are set onto fixed pins, i.e., pins 702 and precision fixed pins 710, the lifted display units are displaced from their original positions by as little as 50 microns. Thus, no readjustments of the position of the display panel 230 for each of display units 351-354 is necessary. However, if a different projection assembly 220 is installed in display unit 355 than was removed, an addition adjustment procedure is performed so that display panel 230 of the newly installed projection assembly 220 is planar and square with respect to adjacent display panels and the installation gap 705 is suitably narrow. The adjustment procedure involves fine-tuning the position of display panel 230 by rotating adjustment screws 711 to reposition adjustable hangers 720 as desired.

In sum, embodiments of the invention set forth systems for removing a display unit or components thereof from a tiled display wall. Advantages of the present invention include the convenient removal of a display unit from a tiled display wall with minimal risk of damaging delicate external components of the display unit. Another advantage of the present invention is that display units that have been moved to create adequate clearance for access to another display unit can be quickly and repeatably returned to their original locations without the need for additional position adjustment while maintaining image integrity of the tiled display wall.

While the foregoing is directed to embodiments of the present invention, other and further embodiments of the invention may be devised without departing from the basic scope thereof, and the scope thereof is determined by the claims that follow.

We claim:

1. A system for removing one or more display units from a multi-display-unit assembly, the system comprising:
   a vertical motion actuator; and
   a lift structure coupled to the vertical motion actuator and configured to selectively engage and lift one or more display units when the lift structure is raised by the vertical motion actuator and to rotate a constrained amount about a vertical axis when lifting the one or more display units, wherein each display unit includes:
      a precision frame configured to couple to a vertically adjacent display unit;
      a display surface, and the multi-display-unit assembly is configured to have a substantially uniform gap between each display unit that is less than about 2mm;
      fixed pins positioned on the precision frame; and
      a projection assembly having adjustable hangers that are configured to engage the fixed pins and adjust the position of the projection assembly with respect to adjacent projection assemblies of adjacent display units.

2. The system of claim 1, wherein the lift structure includes a plurality of lifting members arranged along a vertical column, each lifting member having an associated lift position, so that each of the one or more display units is engaged by and lifted with a different lifting member when the lift structure is raised by the vertical motion actuator.

3. The system of claim 2, wherein the lifting members are organized into subgroups and the lifting members in each subgroup are configured to sequentially lift one or more display units that are aligned vertically in the multi-display-unit assembly starting from the top display unit and followed by each progressively lower display unit.

4. The system of claim 3, wherein a vertical separation between the lifting member that lifts a first display unit and the lifting member that lifts a second display unit that is vertically adjacent to and below the first display unit is less than a vertical separation between the lifting member that lifts the second display unit and the lifting member that lifts a third display unit that is vertically adjacent to and below the second display unit.

5. The system of claim 2, wherein the lifting members are vertically aligned when lifting members are located at the associated lift position.

6. The system of claim 2, wherein each unique combination of lift positions enables the lifting members to engage and lift a unique combination of display units.

7. The system of claim 1, further comprising a removable lifting mechanism configured to attach to the lift structure, to lift a display unit, and to extend away from the lift structure to move the display unit away from the multi-display-unit assembly.

8. The system of claim 7, wherein the removable lifting mechanism is configured with two lift points disposed along a first axis to reduce tilting of the lifted display unit about a second axis that is substantially orthogonal to the first axis and with two lift points disposed along the second axis to reduce tilting of the lifted display unit about the first axis.

9. The system of claim 1, wherein the multi-display-unit assembly is configured to have a substantially uniform gap between each display unit that is greater than about 0.5 mm.

10. The system of claim 1, wherein the lift structure is structurally independent from the multi-display-unit assembly.

11. The system of claim 1, wherein the lift structure is configured to provide access to any display unit from any column of display units in the multi-display-unit assembly.

12. The system of claim 1, wherein the lift structure is fixed in place for providing access to a display unit from a single column of display units in the multi-display-unit assembly.

13. The system of claim 1, wherein the vertical motion actuator comprises a screw-based actuator.

14. The system of claim 1, further comprising a coaxial support column disposed in the lift structure and configured as the axis of rotation of the lift structure.

15. The system of claim 1, further comprising one or more rails configured to align the one or more display units when lifted by the lift structure.

16. A system for removing one or more display units from a multi-display unit assembly, the system comprising:
   a vertical motion actuator; and
   a lift structure coupled to the vertical motion actuator and configured to selectively engage and lift one or more display units when the lift structure is raised by the vertical motion actuator and to rotate a constrained amount about a vertical axis when lifting the one or more display units, wherein the lift structure includes:
      a plurality of lifting members arranged along a vertical column, each lifting member having an associated lift position, so that each of the one or more display units is engaged by and lifted with a different lifting member when the lift structure is raised by the vertical motion actuator, wherein the lifting members are organized into subgroups and the lift position associated with each subgroup of lifting members is radially offset on the vertical column from the lift position associated with each of the other subgroups of lifting members.

17. The system of claim 16, wherein each subgroup of lifting members is selected sequentially by rotating the vertical column to different radial orientation when the lift structure is disengaged from the one or more display units.

18. The system of claim 16, wherein each display unit includes a precision frame configured to couple to a vertically adjacent display unit.

19. The system of claim 16, wherein the vertical motion actuator comprises a screw-based actuator.

20. The system of claim 16, further comprising one or more rails configured to align the one or more display units when lifted by the lift structure.

* * * * *